United States Patent [19]
Christensen et al.

[11] 3,734,219
[45] May 22, 1973

[54] STEERING SYSTEM FOR SNOWMOBILES AND THE LIKE

[75] Inventors: Frank G. Christensen, Don Mills, Ontario; Rafael T. Wulff, Bramlea, Ontario, both of Canada

[73] Assignee: Zeverly L. Lapin, Los Angeles, Calif. ; a part interest

[22] Filed: Aug. 11, 1971

[21] Appl. No.: 170,762

[52] U.S. Cl. ................................180/5 R, 280/21 A
[51] Int. Cl. .............................................B62m 27/02
[58] Field of Search.......................180/5, 6, 3, 4, 25; 280/96.1, 16, 21 A, 21 R

[56] References Cited
UNITED STATES PATENTS

| | | | |
|---|---|---|---|
| 3,530,950 | 9/1970 | Lamb | 180/5 R |
| 3,623,563 | 11/1971 | Gostomski | 180/5 R |
| 3,550,706 | 12/1970 | Watkins | 180/5 R |
| 3,480,096 | 11/1969 | Hammitt | 280/96.2 X |

OTHER PUBLICATIONS

Recreational Vehicle Business, page 60, Minneapolis, Minn., May 1971.

*Primary Examiner*—Richard J. Johnson
*Attorney*—Jerome A. Gross

[57] ABSTRACT

A steering system, uniquely suited for snowmobiles, banks the vehicle inward on turning, lessens destabilizing forces acting aft of the center of gravity, and affords steering stability to bring the vehicle out of turns.

7 Claims, 5 Drawing Figures

PATENTED MAY 22 1973 3,734,219

INVENTORS
FRANK G. CHRISTENSEN AND
RAFAEL T. WULFF
BY
ATTORNEY

STEERING SYSTEM FOR SNOWMOBILES AND THE LIKE

CROSS REFERENCE TO RELATED APPLICATIONS

This invention is the subject of British Provisional Patent Application No. 033,78/71 filed Jan. 28, 1971 entitled SNOWMOBILE IMPROVEMENT. Priority is claimed under the International Convention commencing with the filing date of said application.

BACKGROUND OF THE INVENTION

Conventional snowmobiles utilize a pair of steerable skis forward of the center of gravity and a broad power-driven belt which supports the vehicle aft of the center of gravity. The belt is mounted on drive mechanism including lateral shafts which tilt with the vehicle. Each ski may have a semi-elliptic spring which extends above the ski portion in contact with the snow surface; affixed near its center is a clevis-like fitting, mounting a lateral bolt at the lower end of a steerable strut. The steering strut axes may slant forward and downwardly to extend somewhat forwardly of the clevis-like fittings. This should result in some castering effect, to aid in straightening the skis to bring the vehicle out of a turn. However such effect is ordinarily not so great as to be relied upon, especially in high speed turns.

With conventional steering systems, snowmobiles have a serious tendency to overturn; the driver must learn to lean into the turn to counter-balance the overturning effect. An understeering tendency may appear erratically; this behavior seems to result in part from forces acting inward on the outer edge of the driving belt, aft of the center of gravity.

SUMMARY OF THE INVENTION

In the present invention a stable steering system is provided, especially adapted for snowmobiles of otherwise conventional construction. Of its unique features, the most dramatic is that it serves to bank the vehicle toward whichever side to which it is turned. A pair of steering shafts extend slantingly forward and downward. At their lower ends are inward extensions on which the skis are mounted. When the steering shafts are turned, this alters the amount of the downward projections of the skis beneath the lower end of the shafts; the downward projection of the inner ski is lessened and that of the outer ski is increased. This banks the vehicle into the turn, increasing its resistance to overturning. It also serves to lift the driving belt outer edge; this lessens the forces which in a turn act inwardly on that edge. Since these inward forces act aft of the vehicle center of gravity, their tendency is to understeer the vehicle; by the present invention that tendency is relieved.

An unexpectedly favorable effect of the present invention is a marked increase in directional stability; the vehicle tends to straighten itself from turns; and this effect increases with centrifugal force.

DETAILED DESCRIPTION

Figure 1:
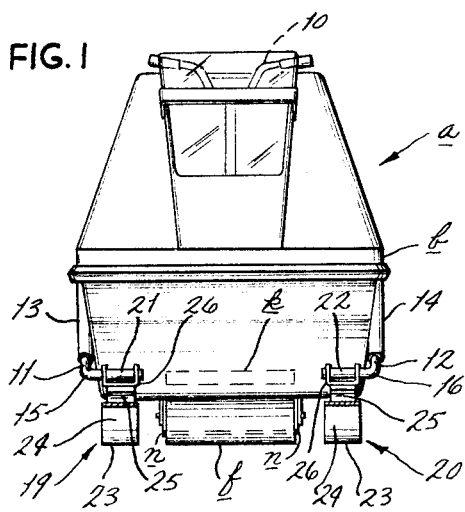
FIG. 1 is a front elevation of a snowmobile whose steering suspension system is an embodiment of the present invention.
Figure 2:
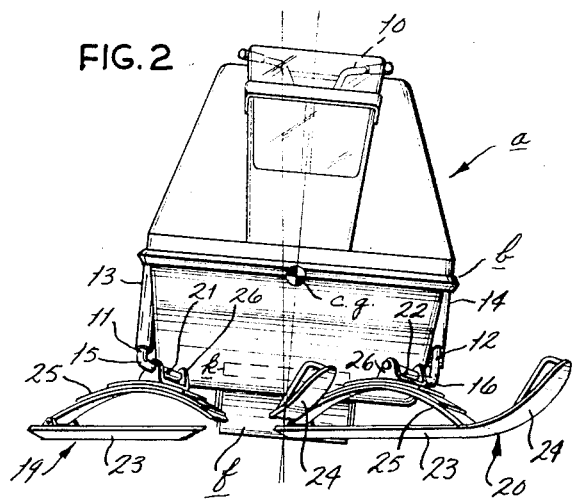
FIG. 2 is a view similar to FIG. 1, showing the snowmobile banked in a turn to the right, as viewed from the front of the vehicle.
Figure 3:
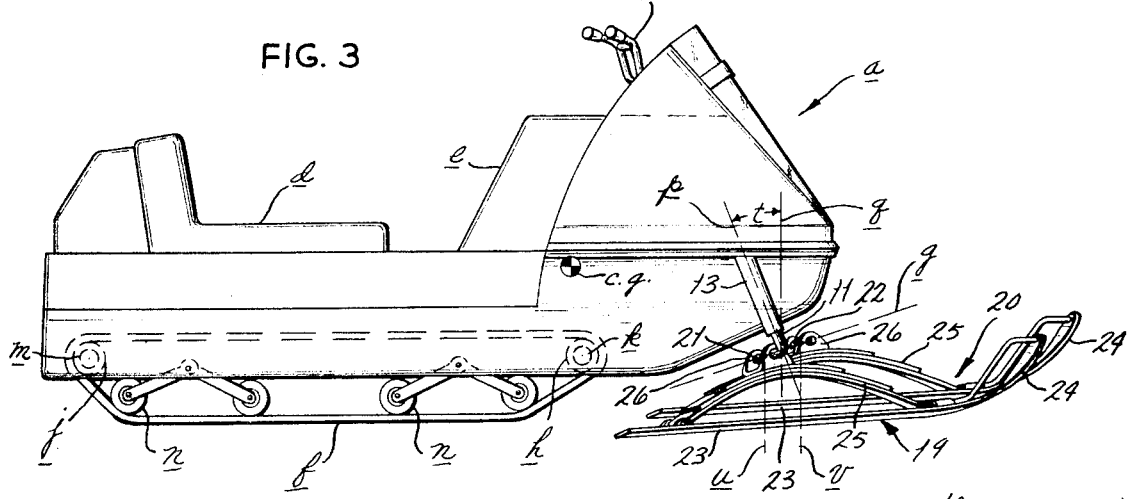
FIG. 3 is a side elevation, somewhat schematic, showing the snowmobile as if suspended from above, with the steering mechanism turned correspondingly to FIG. 2.

A snowmobile, conventional except for the steering suspension of the present invention, is shown in FIGS. 1, 2 and 3. The vehicle, generally designated $a$, includes a rigid structure $b$ and an internal combustion engine, not shown. The approximate location of its center of gravity is shown by the conventional cross-shaded circle symbol designated c.g. shown in FIGS. 2 and 3. An upholstered driver's seat $d$ is mounted on a longitudinally central mechanism enclosure $e$. The aft portion of the vehicle $a$ is supported on a driving belt $f$, located symmetrically with respect to the fore-and-aft center line of the vehicle. The belt $f$ runs around a conventional engine-driven sprocket $h$ and rear sprocket $j$, mounted respectively on forward and aft shafts $k$, $m$ rigidly secured to the structure $b$ of the snowmobile and tiltable with it. A set of resiliently supported bogie wheels $n$ between the forward and aft shafts $k$, $m$ are shown schematically.

In the present steering system, control is exerted through a steering handle 10 connected by conventional linkage, not shown, to left and right steering shafts 11, 12. These are mounted in elongated bushings 13, 14 which are so secured to the structure $b$ as to slope forward and downward, preferably in substantially parallel planes spaced symmetrically from the fore-and-aft center line of the vehicle $a$, as best shown in FIG. 2. Preferably the bushings 13, 14 are affixed to the structure $b$ somewhat farther outboard than is conventional. Positioned by the sloping bushings 13, 14, the axis $p$ of each of the steering shafts 11, 12 slopes forward and downward; if measured from vertical lines $q$ through the left and right shaft lower ends 15, 16, the axes $p$ are at an angle $t$ which may be approximately 25° more or less. As seen in FIG. 3, the shaft lower ends 15, 16 are positioned well forward of the vehicle center of gravity; there they mount a pair of conventional left and right skis 19, 20 on substantially lateral pivot axes, as hereafter more fully described.

FIG. 3, as previously described, shows the snowmobile $a$ as if suspended in level horizontal position, with the steering control 10 turned, as in turning the vehicle to the right. This figure illustrates the effective caster of the system. Since the skis 19, 20 are pivot-mounted on normally lateral axes, extending from the shaft lower ends 15, 16 spacedly above the surface on which the skis rest, reactions at the surface may be considered as centered or concentrated at points vertically below such lateral pivot axes. Side forces there exerted on each ski will have a castering tendency because they will exert a turning moment abOut the axes $p$, whose downward projections extend forward of the points at which the surface reactions are centered.

In the embodiment illustrated in FIGS. 1-3, at the lower ends of the ends 15, 16 of the shafts 11, 12 are inwardly turned left and right stub shafts 21, 22, which normally extend horizontally inboard in alignment with each other, to serve as the lateral pivot axes on which skis generally designated 19, 20 are mounted. The skis 19, 20 are the forward support means for the snowmobile $a$; each has a longitudinally flat surface-contacting portion 23 and upwardly-turned curved forward portion 24. A semi-elliptic spring 25 extends upward from the surface-contacting portion 23 of each ski. At substantially its mid-point, there is bolted to its upper surface a clevis- or trunnion-like fitting 26, through which the stub shafts 21, 22 extend inwardly. Together the shafts 21, 22 and fittings 26 serve as means to provide normally lateral pivot axes for the skis 19, 20. Securement on the upper portions of the springs 25 establishes a spaced vertical projection of the lower shaft ends 15, 16 above the surface on which the ski portion 23, 24 rest.

Attention is directed now to FIG. 3. On turning the controls 10, the left stub shaft 21 is rotated in a plane $g$ perpendicular to the axis $p$ at the lower shaft end 15. This would bring the left ski 19 somewhat aft and downward (assuming the vehicle $a$ was suspended); simultaneously the right stub shaft 22 is rotated forward and would be brought upwardly, raising the right ski 20.

Since the vehicle $a$ is not suspended, the effect of turning the skis is to tilt it as shown in FIG. 2. Rotation, in the canted plane $g$, of the stub shaft 21 at the outer side of the turn brings the center of its trunnion fitting 26 aft; this presses the outer ski 19 downward and increases the vertical projection of the left shaft lower end 15 above the surface, raising the outer side of the snowmobile $a$. The effect of rotating the stub shaft 22 at the inner side of the turn is to lessen the vertical distance from the shaft lower end 16 to the surface, lowering the inner side of the vehicle. The results are that the vehicle is banked as shown in FIG. 2 and its c.g. is brought slightly inward, increasing its resistance to overturning. The driver need not learn to lean inward.

This mechanism operates much as a person skiing. In starting from a slightly crouched position, he straightens the knee of his outer leg and bends the knee of his inner leg, to lean into the turn and exert a strong outward thrust while the turn continues.

Banking the vehicle has a significant effect on the driving belt $f$ aft of the center of gravity. Being mounted on forward and aft shafts k, m which tilt with the body $b$, the belt $f$ will also tend to tilt with the snowmobile $a$. As it tilts on turning, as illustrated in FIG. 2, the lower edge of the belt $f$ on the outer side of the turn is raised slightly from the surface.

Raising the outer edge of the belt $f$ lessens the tendency of such vehicles to understeer erratically. Such understeering appears to be due in part to forces exerted inward against the outer edge of the driving belt on turns. These forces, which may be considered as centripetal, vary somewhat with the smoothness of the surface. They act aft of the center of gravity of the vehicle, and tend to rotate it about its center of gravity in an understeering sense. This undesirable tendency is reduced by the present banking which raises the belt outer edge, so that such inward forces act only on the belt undersurface rather than on its edge.

In using the present invention, a remarkable increase has been observed in steering stability; the vehicle tends to straighten itself to come out of turns, and this tendency appears to increase with the sharpness of the turn and the speed of turning. These favorable effects are believed to result from an increase in effective caster of the ski on the outer side of the turn, which may be explained as follows:

FIG. 3 illustrates how, in turning, the centers of the trunnion fittings 26 are moved in a fore-and-aft sense relative to their former positions shown by the line $q$. The vertical line $u$ designates the position of the center of the trunnion fitting 26 for the left stub shaft 21 as it has moved aft; while the line $v$ designates the positions of the center of the fitting 26 for the right stub shaft 22 as it has moved forward. Thus in the turn illustrated, the surface forces on the left ski 19 at the outer side of the turn will act at the position $u$, while those on the right ski 20 at the inner side of the turn will act at the position $v$.

Figure 4:
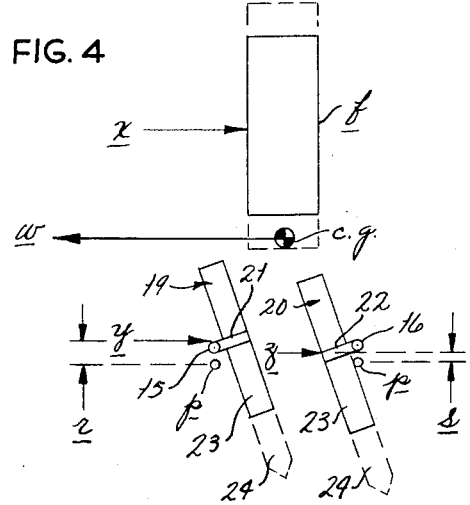
FIG. 4 is a schematic plan view of the positions of the skis and driving belt in a turn and the forces which act thereon to affect steering stability.

Referring now to FIG. 4, the schematic view shows positions of the skis 19, 20 and the driving belt $f$ as they contact the snow surface while so turning. The centrifugal force $w$ is shown acting outward at the center of gravity of the vehicle. It is counteracted by three inward-acting forces: the force $x$ at the driving belt aft of the center of gravity, and the forces $y$ and $z$ at the trunnion centers of the skis. Assuming that the vehicle is not skidding outward, these inward-acting forces will equal the outward-acting centrifugal force $w$.

The centrifugal force $w$ acts outward at the vehicle center of gravity spacedly above the snow surface; its tendency to overturn the vehicle shifts an increased part of its weight to the outer ski 19. The inward forces $y$ and $z$ acting in a turn on the skis will be substantially proportionate to the weight distribution between them; that is, the inward force $y$ on the outer ski 19 will be greater than the force $z$ on the inner ski 20 and this difference will increase with the centrifugal force $w$.

With the rotation of the stub shafts 21, 22 the trunnion center of the left stub shaft 21 will have moved back to the position $u$ and the trunnion center of the right stub shaft 21 will have moved forward to the position $u$. From FIG. 4 it appears that the larger inward force $y$ also has a longer moment arm $r$ about the downward continuation of the left steering axis $p$. Tightening the turn increases this moment arm $r$, and increasing the speed increases the force $y$ there acting. Thus the outer ski exerts a greater castering tendency, which increases with centrifugal force. Though there is a shortening of the moment arm $s$ at which the side force $z$ exerts its castering tendency behind the axis extension $p$ of the inner ski 20, this becomes immaterial because the weight on this ski has been lessened.

The performance of snowmobiles equipped with the present steering apparatus is consistent with the foregoing explanation, which is therefore believed to be accurate.

Figure 5:
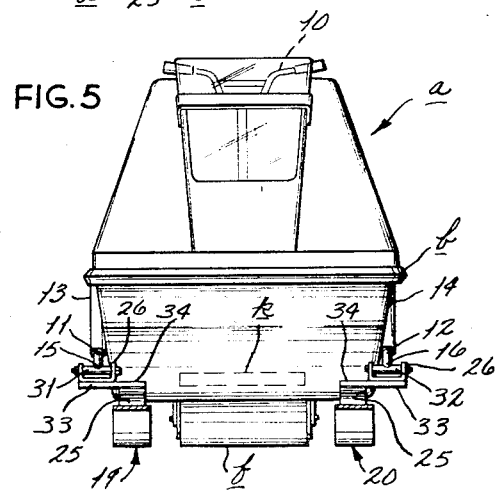
FIG. 5 is a front elevation of an alternate embodiment of the present steering system.

An alternate embodiment of the present invention is shown in FIG. 5, in which parts which are identical to those of FIG. 1 are correspondingly numbered and no further description of them is offered. In this alternate embodiment, at the lower ends 15, 16 of the left and right steering shafts 11, 12, there are left and right stub shafts 31, 32 which extend to both sides of center; Both ends are mounted within the trunnion-like fittings 26 which are centered below the steering shaft ends 15, 16. The fittings 26 are bolted not to the springs 25 themselves but to the upper surfaces of substantially flat, horizontal plate-like brackets 33 on which extend inward to inboard portions 34 which are bolted onto the upper mid-portions of the springs 25.

In this embodiment, as in the embodiment heretofore illustrated, the skis 19, 20 project downward from and inward of the lower ends 15, 16 of the forward and downward slanting steering shafts 11, 12. Rotation of the steering shafts 11, 12 in a turn causes the same favorable banking tendency as in the first described embodiment, and the same positive stability in steering is achieved.

The present invention is not limited to the specific embodiments described. For example, it will apply to that type of snowmobile using not a single broad driving belt, but a pair of driving belts located symmetrically about the fore-and-aft center line of the vehicle. It also has applications to vehicles with other types of surface contacting portions; thus for some uses wheels may be mounted on the stub shafts 21, 22 instead of the skis 19, 20.

We claim:

1. A vehicle steering system, comprising:

a pair of steering shafts forward of the vehicle center of gravity, which shafts slope forward and downward in substantially parallel planes to lower ends, steerable means at the lower ends of the steering shafts to provide normally lateral pivot axes, a pair of vehicle support means, each having a surface-contacting portion, and means to mount one of said vehicle support means pivotally on each of said normally lateral pivot axes with its surface-contacting portion spaced substantially inward of the axis of the steering shaft, whereby on turning of the steering shafts to steer the vehicle in a turn, the vertical distance from the lower end of the steering shaft to the surface-contacting portion at the inner side of the turn will be lessened, and at the outer side of the turn the corresponding vertical distance will be increased, thereby banking the vehicle and increasing its stability in respect to centrifugal forces.

2. For use with a snowmobile, the steering system defined in claim 1, wherein the vehicle support means are skis, the vehicle further having driving belt means located symmetrically with respect to said fore-and-aft centerline and on which the vehicle in supported aft of its center of gravity, whereby on banking in a turn, the edge of said belt means on the outer side of the turn is somewhat raised, thereby to lessen the tendency of centripetal forces on said edge to understeer the vehicle.

3. For use with a snowmobile, the steering system defined in claim 3, wherein the vehicle support means further includes a member extending upwardly from each said ski, and the means to provide normally lateral pivoting axes are stub shafts, extending substantially radially from the lower end of each steering shaft, and the means to mount the vehicle support means pivotally includes trunnion-like means affixed to said upward-extending members.

4. For use with a snowmobile, the steering system defined in claim 3, in which the stub shafts extend inward from the lower ends of the steering shafts, and the trunnion-like means are fixed directly upon upper portions of said upward-extending members.

5. For use with a snowmobile, the steering system define in claim 3, wherein the said stub shafts extend to both sides of center of the steering shafts, and the trunnion-like means mounts clevis-like to both sides thereof, and the means to mount the vehicle support means includes brackets extending from beneath said trunnion-like means, inwardly to said members which extend upward from the skis.

6. An easily turned steering system for snowmobiles of the type having a pair of forward mounted skis and a driving belt means mounted beneath the rear portion of and tiltable with the vehicle, comprising a pair of steering shafts extending slantingly forward and downward in substantially parallel planes, inward extensions therefrom steerable by rotation of the shafts, the skis being mounted on and projecting downward from said inward extensions, and control means to turn said steering shafts simultaneously, whereby in a turn, the downward projections of the skis beneath the shafts are altered by lessening such projection of the inner ski and increasing such projection of the outer ski, thereby banking the vehicle and raising the outer edge of the driving belt means to lessen its under-steering effect.

7. A directionally stable steering system for snowmobiles of the type having a pair of forward mounted skis, comprising a pair of steering shafts having downward extending axes sloping forward in substantially parallel planes, means to mount one of such skis onto and spacedly inward of each said shaft and with effective caster relative to its axis, and control means to turn said steering shafts simultaneously to effect turning movement of such vehicle, whereby, on turning, the effective caster of the ski at the outer side of the turn is increased while that of the ski at the inner side of the turn is decreased, thereby to afford directional stability increasing with centrifugal force.

* * * * *